United States Patent
Xu et al.

(10) Patent No.: US 11,758,488 B2
(45) Date of Patent: Sep. 12, 2023

(54) TRANSMIT POWER OF PAGING EARLY INDICATION (PEI)

(71) Applicant: QUALCOMM Incorporated, San Diego, CA (US)

(72) Inventors: Huilin Xu, Temecula, CA (US); Le Liu, Fremont, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 106 days.

(21) Appl. No.: 17/365,920

(22) Filed: Jul. 1, 2021

(65) Prior Publication Data
US 2023/0007600 A1 Jan. 5, 2023

(51) Int. Cl.
*H04W 52/52* (2009.01)
*H04W 68/02* (2009.01)

(52) U.S. Cl.
CPC .......... *H04W 52/52* (2013.01); *H04W 68/02* (2013.01)

(58) Field of Classification Search
CPC ............. H04L 65/104; H04L 12/40032; H04L 1/0025; H04L 5/0051; H04L 5/00; H04L 1/16; H04L 5/0048; H04L 5/005; H04W 52/52; H04W 68/02; H04W 52/143; H04W 52/28; H04W 52/0212; H04W 52/0235; H04W 56/0055; H04W 48/08; H04W 84/06; H04W 68/005; H04W 24/08; H04W 72/042; H04W 72/0446; H04W 7/042
USPC ......................................................... 370/329
See application file for complete search history.

(56) References Cited

U.S. PATENT DOCUMENTS

| 11,419,093 B2* | 8/2022 | Babaei ................ H04W 72/23 |
| 11,510,176 B2* | 11/2022 | He ....................... H04W 68/005 |
| 2022/0046582 A1* | 2/2022 | Shrivastava .......... H04W 68/02 |
| 2022/0046585 A1* | 2/2022 | Wu ....................... H04W 72/23 |
| 2022/0078710 A1* | 3/2022 | Xu .................... H04W 52/0235 |

(Continued)

OTHER PUBLICATIONS

Mediatek Inc.: "Paging Enhancements for UE PowerSaving in NR", 3GPP TSG-RAN WG2 Meeting #111 electronic, R2-2007190, 3rd Generation Partnership Project, Mobile Competence Centre, 650, Route Des Lucioles, F-06921 Sophia-Antipolis Cedex, France, vol. RAN WG2, No. Online, Aug. 17, 2020-Aug. 28, 2020, Aug. 7, 2020, XP051911999, 23 Pages.

(Continued)

*Primary Examiner* — Man U Phan
(74) *Attorney, Agent, or Firm* — Norton Rose Fulbright US LLP

(57) ABSTRACT

This disclosure provides systems, methods, and devices for wireless communication that support mechanisms for determining a transmit power of a paging early indication (PEI) transmission. In particular, a user equipment (UE) receives a PEI from a base station indicating whether the UE is being paged during a paging occasion. The UE determines a transmit power of the PEI transmission. In some aspects, the UE determines the transmit power of the PEI transmission based on a configuration of the PEI provided to the UE, which may include an indication of the PEI transmission power as an absolute power value and/or a power offset value with respect to another transmission, signal, or channel. In some aspects, the transmit power of the PEI transmission is based on whether the PEI transmission is a beamformed transmission.

39 Claims, 8 Drawing Sheets

(56) References Cited

U.S. PATENT DOCUMENTS

| | | | | |
|---|---|---|---|---|
| 2022/0124672 | A1* | 4/2022 | Xu | H04W 68/025 |
| 2022/0225237 | A1* | 7/2022 | He | H04W 68/005 |
| 2022/0232514 | A1* | 7/2022 | Tseng | H04W 60/00 |
| 2022/0256632 | A1* | 8/2022 | Shrivastava | H04W 68/005 |
| 2022/0271878 | A1* | 8/2022 | Lin | H04L 5/005 |
| 2022/0303089 | A1* | 9/2022 | Liao | H04W 68/02 |
| 2022/0312369 | A1* | 9/2022 | He | H04W 68/02 |
| 2022/0321296 | A1* | 10/2022 | Ye | H04L 1/1614 |
| 2022/0322281 | A1* | 10/2022 | Liao | H04W 76/27 |
| 2022/0322284 | A1* | 10/2022 | He | H04W 4/08 |
| 2022/0330201 | A1* | 10/2022 | Hwang | H04L 5/0094 |
| 2022/0330205 | A1* | 10/2022 | Babaei | H04W 72/23 |
| 2022/0369264 | A1* | 11/2022 | Cheng | H04W 48/08 |

OTHER PUBLICATIONS

Moderator (Mediatek): "Summary of Paging Enhancements", 3GPP TSG RAN WG1 #105-e, R1-2106076 (R1-210XXXX), 3rd Generation Partnership Project, Mobile Competence Centre, 650, Route Des Lucioles, F-06921 Sophia-Antipolis Cedex, France, vol. RAN WG1, No. e-Meeting, MAy 10, 2021-May 27, 2021, May 20, 2021, XP052012833, 78 Pages.

Moderator (Samsung): "Moderator Summary for TRS/CSI-RS Occasion(s) for Idle/Inactive UEs", 3GPP TSG RAN WG1 #103-e, R1-2008178, 3rd Generation Partnership Project, Mobile Competence Centre, 650, Route Des Lucioles, F-06921 Sophia-Antipolis Cedex, France, vol. RAN WG1, No. e-Meeting, Oct. 26, 2020-Nov. 13, 2020, Nov. 14, 2020, XP051954346, Sections 2, 52 Pages.

Panasonic: "On Paging Enhancement", 3GPP TSG RAN WG1 Meeting #104-e, R1-2101300, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 18, 2021, XP051970714, 6 Pages.

Partial International Search Report—PCT/US2022/072060—ISA/EPO—dated Aug. 18, 2022.

Vivo: "Paging Enhancements for Idle/Inactive Mode UE Power Saving", 3GPP TSG RAN WG1 #105-e, R1-2106011 (revised from R1-2104371), 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 25, 2021, XP052013810, 15 Pages.

International Search Report and Written Opinion—PCT/US2022/072060—ISA/EPO—dated Oct. 12, 2022.

* cited by examiner

TRANSMIT POWER OF PAGING EARLY INDICATION (PEI)

TECHNICAL FIELD

Aspects of the present disclosure relate generally to wireless communication systems, and more particularly, to determining a transmit power of a paging early indication (PEI) transmission.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes receiving, by the UE, a paging early indication (PEI) transmission from a base station before a paging occasion configured for the UE, the PEI transmission including an indication of whether the UE is to be paged during the paging occasion, determining a transmit power of the PEI transmission, and performing one or more further operations based on the determined transmit power of the PEI transmission.

In an additional aspect of the disclosure, a method of wireless communication performed by a base station includes configuring a PEI transmission to be transmitted to a UE before a paging occasion configured for the UE based on a PEI configuration. In aspects, the PEI transmission may include an indication of whether the UE is to be paged during the paging occasion, and configuring the PEI transmission may include configuring a transmit power of the PEI transmission based on the PEI configuration. The method further includes transmitting the PEI transmission to the UE before the paging occasion at the transmit power. In aspects, the UE may be configured to determine the transmit power of the PEI transmission and to perform one or more further operations based on the determined transmit power of the PEI transmission.

In an additional aspect of the disclosure, a UE includes at least one processor and a memory coupled to the at least one processor. The at least one processor stores processor-readable code that, when executed by the at least one processor, is configured to perform operations including receiving, by the UE, a PEI transmission from a base station before a paging occasion configured for the UE, the PEI transmission including an indication of whether the UE is to be paged during the paging occasion, determining a transmit power of the PEI transmission, and performing one or more further operations based on the determined transmit power of the PEI transmission.

In an additional aspect of the disclosure, a base station includes at least one processor and a memory coupled to the at least one processor. The at least one processor stores processor-readable code that, when executed by the at least one processor, is configured to perform operations including configuring a PEI transmission to be transmitted to a UE before a paging occasion configured for the UE based on a PEI configuration. In aspects, the PEI transmission may include an indication of whether the UE is to be paged during the paging occasion, and configuring the PEI transmission may include configuring a transmit power of the PEI transmission based on the PEI configuration. The operations further include transmitting the PEI transmission to the UE before the paging occasion at the transmit power. In aspects, the UE may be configured to determine the transmit power of the PEI transmission and to perform one or more further operations based on the determined transmit power of the PEI transmission.

In an additional aspect of the disclosure, a non-transitory computer-readable medium stores instructions that, when executed by a processor, cause the processor to perform operations. The operations include receiving, by the UE, a PEI transmission from a base station before a paging occasion configured for the UE, the PEI transmission including an indication of whether the UE is to be paged during the paging occasion, determining a transmit power of the PEI transmission, and performing one or more further operations based on the determined transmit power of the PEI transmission.

In an additional aspect of the disclosure, a non-transitory computer-readable medium stores instructions that, when executed by a processor, cause the processor to perform operations. The operations include configuring a PEI transmission to be transmitted to a UE before a paging occasion configured for the UE based on a PEI configuration. In aspects, the PEI transmission may include an indication of whether the UE is to be paged during the paging occasion, and configuring the PEI transmission may include configuring a transmit power of the PEI transmission based on the PEI configuration. The operations further include transmitting the PEI transmission to the UE before the paging occasion at the transmit power. In aspects, the UE may be configured to determine the transmit power of the PEI transmission and to perform one or more further operations based on the determined transmit power of the PEI transmission.

In an additional aspect of the disclosure, an apparatus includes means for receiving, by the UE, a PEI transmission from a base station before a paging occasion configured for the UE, the PEI transmission including an indication of whether the UE is to be paged during the paging occasion, means for determining a transmit power of the PEI transmission, and means for performing one or more further operations based on the determined transmit power of the PEI transmission.

In an additional aspect of the disclosure, an apparatus includes means for configuring a PEI transmission to be transmitted to a UE before a paging occasion configured for the UE based on a PEI configuration. In aspects, the PEI transmission may include an indication of whether the UE is to be paged during the paging occasion, and configuring the PEI transmission may include configuring a transmit power of the PEI transmission based on the PEI configuration. The apparatus further includes means for transmitting the PEI transmission to the UE before the paging occasion at the transmit power. In aspects, the UE may be configured to determine the transmit power of the PEI transmission and to perform one or more further operations based on the determined transmit power of the PEI transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
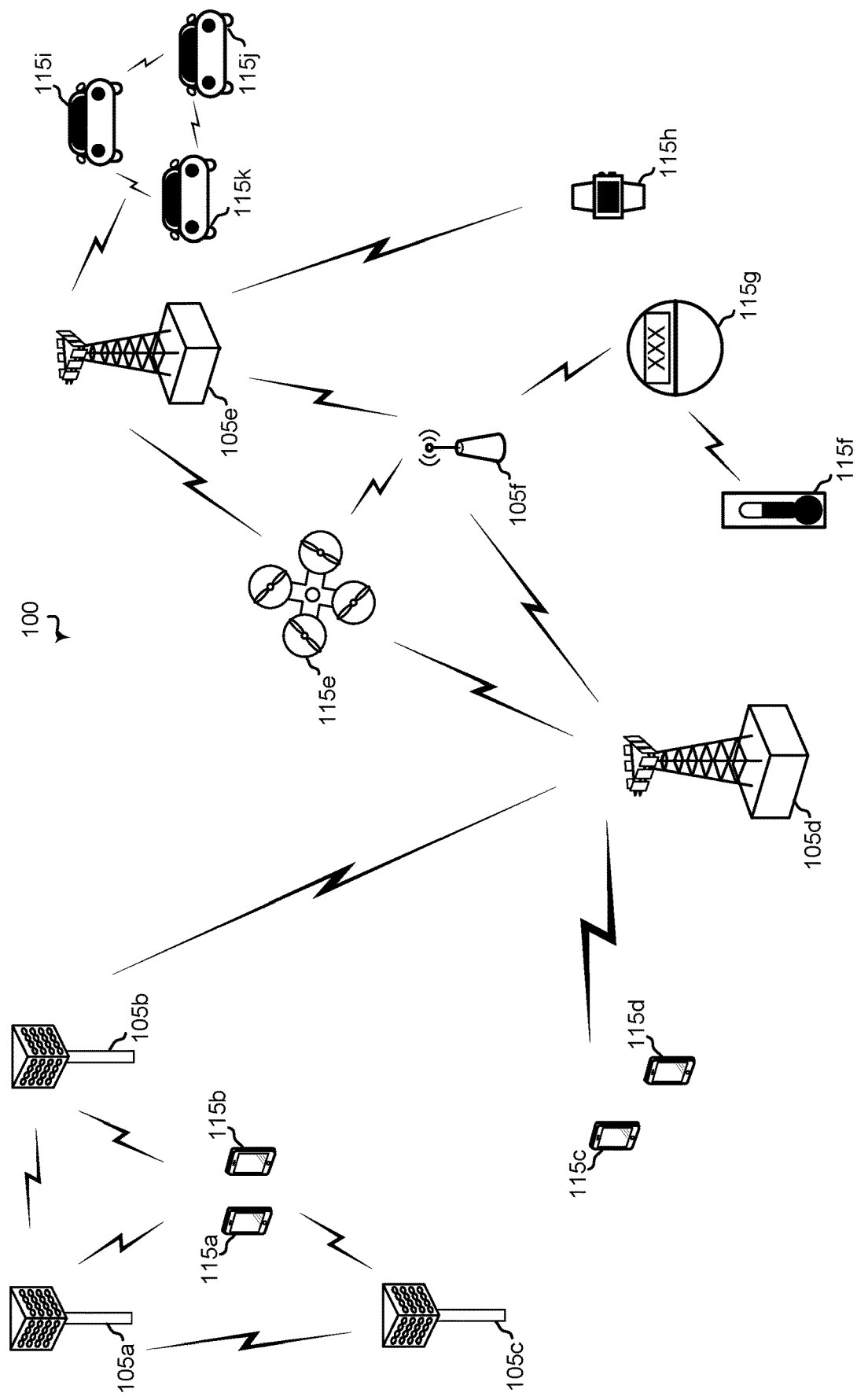
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

Various aspects of the present disclosure are directed to systems and methods that support mechanisms for determining a transmit power of a paging early indication (PEI) transmission. In particular, in aspects of the present disclosure, a user equipment (UE) may be configured to receive a PEI from a base station indicating whether the UE is being paged during a paging occasion. The UE may be configured to determine a transmit power of the PEI transmission. In aspects, the UE may determine the transmit power of the PEI transmission based on a configuration of the PEI provided to the UE. In aspects, the determined transmit power of the PEI transmission may be an absolute power value or may be a power offset value. The power offset value may be a power offset with respect to a transmission of another signal or channel. In some aspects, the transmit power of the PEI transmission may be based on whether the PEI transmission is a beamformed transmission. In aspects, the transmit power of the PEI transmission may be the same for all beams, and the transmit power value may be provided in a single configuration for all beams.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*.

Figure 2:
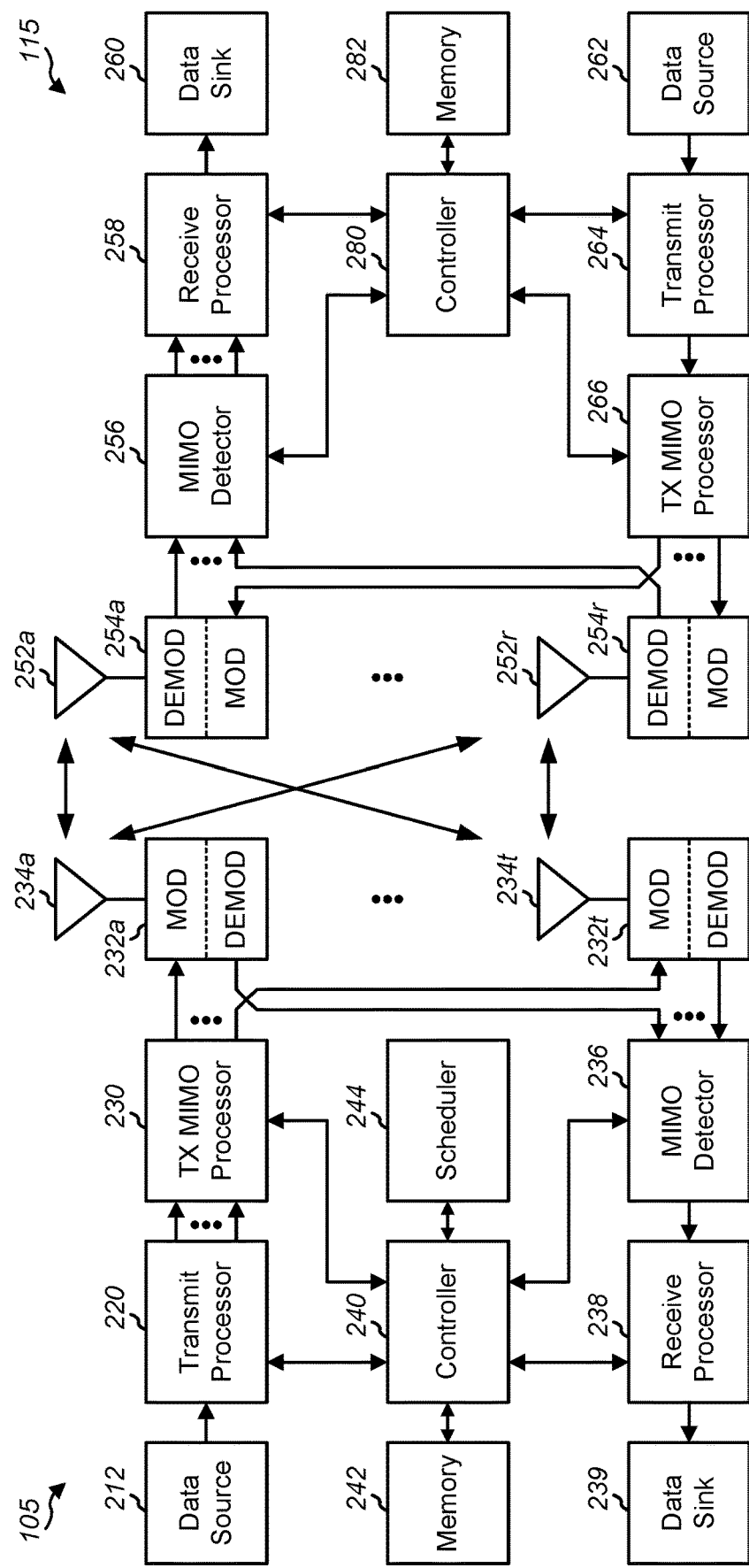
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 5 and 6, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Current implementations of wireless communication systems put a significant emphasis on power saving performance of a device (e.g., a UE) in order to provide an adequate battery life that enhances the user experience. Various approaches have been implemented and proposed for improving power savings. One particular approach for improving power savings involves configuring a UE with various power modes or states. The various power modes or states may include an active mode, an inactive mode, an idle mode, etc. In the active mode (also referred to herein as the awake state), the UE may be fully powered on to transmit to and received from a base station (and/or other UEs). In the inactive and idle mode (also referred to herein as sleep states), the UE may be configured to turn-off various components (e.g., some radio transceivers, etc.) in order to conserve battery life. In a sleep state, the UE may still receive (and/or transmit) some control signals that may be used to control when the UE may be awaken (e.g., transitioned in to the awake state to process received signals). In some cases, the UE may be configured to transition from a sleep state to the awake state periodically to determine whether the UE is being paged during periodic paging occasions. After the paging occasion, the UE may transition back a sleep state. Although the reduced-power modes (e.g., the sleep states) provide power savings to the UE, the periodic transitions between the awake state and the sleep state reduce the power savings that may be obtained by the usage of the different power modes.

Figure 4:
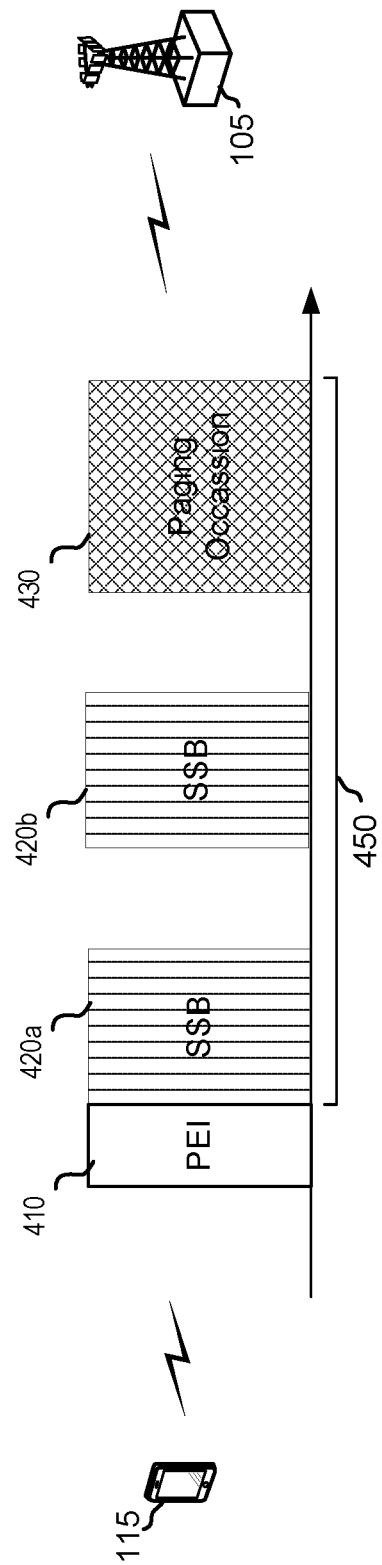
FIG. 4 is a diagram illustrating an example of a configuration for transmitting a PEI from a base station to a user equipment (UE).

One approach that has been proposed to improve the power savings performance of wireless communication devices in reduced-power modes (e.g., sleep state) includes a proposal to reduce unnecessary paging and/or paging receptions of the UE. In one solution, a paging early indication (PEI) may be transmitted before a paging occasion from a base station to a UE to indicate to the UE whether the UE is being paged. FIG. 4 is a diagram illustrating an example of a configuration for transmitting a PEI from a base station to a UE. As shown, UE 115 may be configured to receive a PEI 410 before paging occasion 430. In typical implementations (e.g., in implementations configured without PEI techniques), UE 115 may typically wake up (e.g., transition from a sleep state to the awake state) at the start of period 450, before paging occasion 430, in order to determine whether UE 115 is being paged during paging occasion 430 or not. In one example of typical operations, base station 105 may page UE 115 during paging occasion 430 and may transmit a PDCCH and a PDSCH during the paging occasion. In this case, UE 115 may decode the PDCCH (which may not include an identity of UE 115) and the PDSCH (which may include an identify of UE 115) during paging occasion 430. In another example of typical operations, base station 105 may not page UE 115 during paging occasion 430 and may either not transmit a PDCCH or a PDSCH during paging occasion 430 or may transmit a PDCCH/PDSCH that is not intended for UE 115 (e.g., in implementations where a paging PDSCH is transmitted to a group of UEs that includes UE 115). In this case, UE 115 may still wake up during period 450, and may attempt to decode the PDCCH. The attempt to decode the PDCCH may yield a result indicating that no PDCCH was transmitted to UE 115, in which case UE 115 may determine that it is not being paged, or a result indicating that PDCCH has been received. In the latter case, UE 115 may still not be able to determine whether UE 115 has been paged or not because the PDCCH may not include an indication that UE 115 is being paged. As such, in the latter case, UE 115 may proceed to decode the PDSCH, which may include an indication (e.g., identity of UE 115) as to whether UE 115 is being paged or not. As will be appreciated, in these typical implementations, UE 115 wakes up and process the PDCCH/PDSCH transmission even when it is not being paged, thereby increasing power consumption.

PEI 410 provides an improvement of the power savings performance of UE 115 in several ways. In one way, receiving PEI 410 before paging occasion 430 may allow UE 115 to determine whether UE 115 is being paged during paging occasion 430 or not. If PEI 410 indicates that UE 115 is being paged during paging occasion 430, UE 115 may wake up (or may remain awaken as it may have awakened to receive the PEI) to process the PDCCH/PDSCH transmissions during paging occasion 430. However, if PEI 410 indicates that UE 115 is not being paged during paging occasion 430, UE 115 may remain or transition back to a sleep state, instead or processing transmissions during the paging occasion 430, thereby resulting a power savings.

The above is also the case where the group to which UE 115 belongs is being paged, even though UE 115 is not being paged. In this case, PEI 410 may include an indication that the subgroup to which UE 115 belongs is being paged or not, allowing UE 115 to determine whether to process transmissions during paging occasion 430 or not. For example, base station 105 may be configured with group paging PDSCH transmissions. In this case, base station 105 may be configured to transmit a paging PDSCH to a group of UEs, and every UE in the group decodes the PDSCH even if the PDSCH is intended for one UE. In this example, base station 105 may transmit the paging PDSCH to the group of UEs, which may include UE 115, and PEI 410 may include an indication of whether a subgroup (of the group of UEs associated with the paging occasion) to which UE 115 is being paged. In this case, if PEI 410 indicates that UE 115's subgroup is being paged in the paging PDSCH, UE 115 may wake up (or may remain awaken as it may have awakened to receive the PEI) to process the PDCCH/PDSCH transmissions during paging occasion 430. However, if PEI 410 indicates that UE 115's subgroup is not being paged in the paging PDSCH, UE 115 may remain in or transition back to a sleep state, instead or processing transmissions during the paging occasion 430, thereby resulting a power savings.

In another example, usage of PEI 410 may provide further power savings when PEI 410 is defined based on narrowband sequences. In these cases, UE 115 may determine the narrowband over which PEI 410 is defined and, instead of waking up the entire baseband for processing PEI 410, UE 115 may wake up only the appropriate narrowband. This may result in power savings as otherwise, UE 115 may wake up the entire baseband to process a PDSCH/PDSCH transmission. By merely waking up a portion of the baseband to determine if UE 115 is being paged, UE 115 may obtain power savings.

Usage of PEI 410 may provide further power savings by enabling UE 115 to forego processing of synchronization signal block (SSB) transmissions. Typically, SSB transmission may be used by a UE to access to a base station for processing transmissions, such as transmissions during a paging occasion, For example, UE 115 may use SSB transmission 420a and/or 420b to configure various parameters for decoding transmissions during paging occasion 430. In some cases, the parameters may include updating a tracking loop. In this case, however, UE 115 may use the PEI to determine whether to process SSB transmissions 420a and/or 420b or not. For example, UE 115 may determine to process SSB transmissions 420a and/or 420b when PEI 410 indicates that UE 115 is being paged during paging occasion 430, in order to configured UE 115 for processing of the transmissions. On the other hand, UE 115 may determine to forego processing SSB transmissions 420a and/or 420b when PEI 410 indicates that UE 115 is not being paged during paging occasion 430, and may remain in or transition back to a sleep state, instead or processing the SSB transmissions during the paging occasion 430, thereby resulting a power savings.

However, despite the definite power savings potentials provided by the use of a PEI, there may be further power savings improvements that may be obtained by a wireless communication device based on a knowledge of the transmit power associated with the PEI. Currently, there is no mechanism to determine the transmit power of a PEI. It is noted that, as used herein, the transmit power of a PEI transmission may also refer to the signal strength of the PEI transmission, and/or an energy per resource element (EPRE) of the PEI transmission.

Various aspects of the present disclosure are directed to systems and methods that support mechanisms for determining a transmit power of a PEI transmission. In particular, in aspects of the present disclosure, a UE may be configured to receive a PEI from a base station indicating whether the UE is being paged during a paging occasion. The UE may be configured to determine a transmit power of the PEI transmission. In aspects, the UE may determine the transmit power of the PEI transmission based on a configuration of the PEI provided to the UE. In aspects, the determined transmit power of the PEI transmission may be an absolute power value or may be a power offset value. The power offset value may be a power offset with respect to a transmission of another signal or channel.

In some aspects, the transmit power of the PEI transmission may be based on whether the PEI transmission is a beamformed transmission. In these aspects, the transmit power of the PEI transmission may be the same for all beams, and the transmit power value may be provided in a single configuration for all beams.

It is noted that in some aspects, a PEI may be one of various power savings mechanisms using a pre-wakeup signal. Another power saving mechanism may include usage of a wake up signal (WUS), such as in previous implementations of wireless communication systems. A WUS, unlike the PEI of aspects of the present disclosure, is not beamformed. In PEI implementation, both the PEI transmission and the paging message (e.g., the PDCCH and/or PDSCH) may be beamformed. In that case, a quasi-colocation (QCL) of the beam transmission may be determined when receiving the PEI transmission. However, this is not the case with WUS transmissions. In some cases, systems implementing a WUS may rely on a common reference signal (CRS) as a power reference. For example, these systems may use the power of the CRS transmission as a power reference for power measurement determinations. However, systems implementing PEI in accordance with aspects of the present disclosure, which in some cases do not implement a CRS, may use the power of SSB transmissions as a power reference.

In aspects, knowing a transmit power of a PEI transmission may provide advantages for a UE. For example, a UE may use the PEI transmission for performing RRM measurements for mobility operations, and/or to perform automatic gain control (AGC) updates. In both cases, the UE may use a smaller number of SSBs for RRM measurement and/or tracking loop updates, which may provide further power savings. However, in order to perform these operations, the UE requires knowledge on the power relationship between the PEI and other channels or signals that the UE receives during the reduced-power modes. As noted above, techniques disclosed herein provide a mechanism for the UE to determine a transmit power of the PEI transmission, which may allow the UE to determine the power relationship between the PEI transmission and other channels or signals that the UE receives during the reduced-power states.

Figure 3:
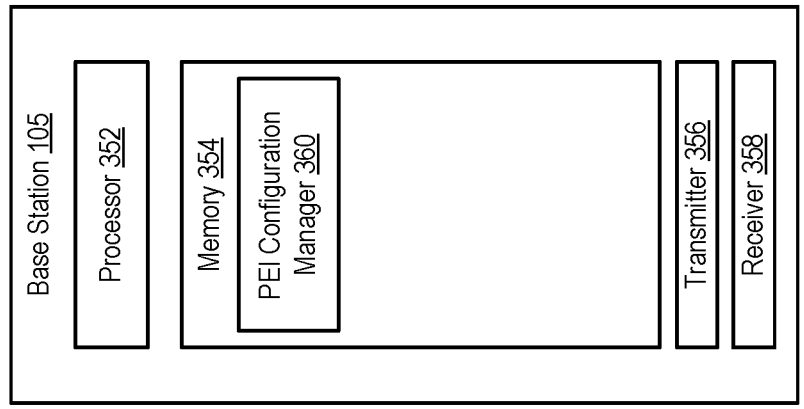
FIG. 3 is a block diagram of an example wireless communications system that supports mechanisms for determining a transmit power of a paging early indication (PEI) transmission in a wireless communication system according to one or more aspects of the present disclosure.
Figure 3:
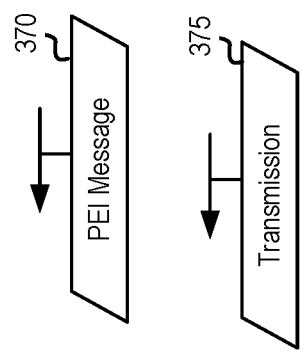
Figure 3:
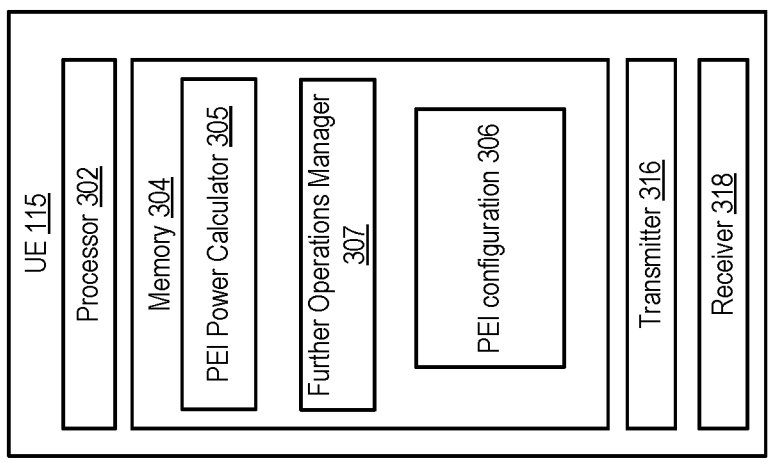

FIG. 3 is a block diagram of an example wireless communications system 300 that supports mechanisms for determining a transmit power of a PEI transmission in a wireless communication system according to one or more aspects of the present disclosure. In some examples, wireless communications system 300 may implement aspects of wireless network 100. Wireless communications system 300 includes UE 115 and base station 105. Although one UE 115 and one base station 105 are illustrated, in some other implementations, wireless communications system 300 may generally include multiple UEs 115 and may include more than one base station 105.

UE 115 may include a variety of components (such as structural, hardware components) used for carrying out one or more functions described herein. For example, these components may include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), and one or more receivers 318 (hereinafter referred to collectively as "receiver 318"). Processor 302 may be configured to execute instructions stored in memory 304 to perform the operations described herein. In some implementations, processor 302 includes or corresponds to one or more of receive processor 258, transmit processor 264, and controller 280, and memory 304 includes or corresponds to memory 282.

Memory 304 includes or is configured to store PEI power calculator 305, PEI configuration 306, and/or further operations manager 307. In aspects, PEI power calculator 305 is configured to perform operations for determining a transmit power of a PEI transmission. In aspects, PEI power calculator 305 may be configured to determine a transmit power of a PEI transmission based on PEI configuration 306, which may specify a configuration of the PEI transmitted to UE 115. In aspects, the PEI configuration 306 may specify a transmit power of the PEI transmission. In some aspects, PEI power calculator 305 may be configured to determine a transmit power of a PEI transmission based on an offset with respect to, or a relationship between the PEI transmission and, another channel or signal transmission. In some aspects, the transmit power of the PEI transmission may be selected by base station 105 from a predefined limited set of transmit power values. In this case, PEI power calculator 305 may be configured to determine a transmit power of a PEI transmission based on the limited set of transmit power offset values with respect to the transmit power of another channel or signal transmission, in which case PEI power calculator 305 may be able to estimate the transmit power more effectively and efficiently as the number of potential values is limited.

Further operations manager 307 may be configured to perform or cause to be perform further operations based on a determined transmit power of the PEI transmission. In aspects, the further operations may include measuring RRM parameters for mobility operations based on the determined transmit power of the PEI, and/or updating an AGC based on the determined power of the PEI.

Transmitter 316 is configured to transmit reference signals, control information and data to one or more other devices, and receiver 318 is configured to receive references signals, synchronization signals, control information and data from one or more other devices. For example, transmitter 316 may transmit signaling, control information and data to, and receiver 318 may receive signaling, control information and data from base station 105. In some implementations, transmitter 316 and receiver 318 may be integrated in one or more transceivers. Additionally or alternatively, transmitter 316 or receiver 318 may include or correspond to one or more components of UE 115 described with reference to FIG. 2.

Base station 105 may include a variety of components (such as structural, hardware components) used for carrying out one or more functions described herein. For example, these components may include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). Processor 352 may be configured to execute instructions stored in memory 354 to perform the operations described herein. In some implementations, processor 352 includes or corresponds to one or more of receive processor 238, transmit processor 220, and controller 240, and memory 354 includes or corresponds to memory 242.

Memory 354 includes or is configured to PEI configuration manager 360. PEI configuration manager 360 may be configured to perform operations for configuring UE 115 for PEI operations, such as configuring UE 115 to receive a PEI before paging occasions, and specifying configuration of the PEI transmission. For example, PEI configuration manager 360 may generate PEI message 370, which may include the PEI configuration and/or the PEI transmission. In aspects, the PEI configuration of the PEI transmissions may include an indication of the transmit power of the PEI transmission, or may specify an offset between the PEI transmission and another signal or channel transmission. In some aspects, the PEI configuration may specify a value of the transmit power of the PEI transmission, where the value is selected from a predefined limited set of transmit power values. In this case, the base station may select the PEI transmit power from the limited set of values. Base station 105 may indicate the selected value in the PEI message 370, or may not indicate the value.

Transmitter 356 is configured to transmit reference signals, synchronization signals, control information and data to one or more other devices, and receiver 358 is configured to receive reference signals, control information and data from one or more other devices. For example, transmitter 356 may transmit signaling, control information and data to, and receiver 358 may receive signaling, control information and data from UE 115. In some implementations, transmitter 356 and receiver 358 may be integrated in one or more transceivers. Additionally or alternatively, transmitter 356 or receiver 358 may include or correspond to one or more components of base station 105 described with reference to FIG. 2.

In some implementations, wireless communications system 300 implements a 5G NR network. For example, wireless communications system 300 may include multiple 5G-capable UEs 115 and multiple 5G-capable base stations 105, such as UEs and base stations configured to operate in accordance with a 5G NR network protocol such as that defined by the 3GPP.

During operation of wireless communications system 300, base station 105 transmits PEI message 370 to UE 115. In aspects, UE 115 may be operating in a reduced-power mode (e.g., the sleep state). In aspects, PEI message 370 may include a PEI transmission sent from base station 105 to UE 115. The PEI transmission may be transmitted to UE 115 at least before a paging occasion configured for UE 115, and may indicate to UE 115 whether or not UE 115 is being paged during the paging occasion. In aspects, the PEI transmission may be transmitted to UE 115 prior to at least one SSB transmission before the paging occasion. In aspects, UE 115 may determine whether or not to perform processing operations based on the paging indication in the PEI transmission indicating whether or not UE 115 is being paged during the paging occasion. For example, UE 115 may determine to wake up (e.g., transition from a sleep state to the awake state), or remain awaken (e.g., remain in the awake state) based on the PEI transmission indicating to UE 115 that UE 115 (or a UE subgroup to which UE 115 belongs) is being paged during the paging occasion. In this case, UE 115 may process transmissions at least during the paging occasion (e.g., PDCCH and/or PDSCH transmissions) and/or transmissions prior to the paging occasions but subsequent to the PEI transmission (e.g., SSB transmissions). However, UE 115 may determine to transition back to a sleep state based on the PEI transmission indicating to UE 115 that UE 115 (or a UE subgroup to which UE 115 belongs) is not being paged during the paging occasion. In this case, UE 115 may forego processing subsequent to the PEI transmission, such as transmissions during the paging occasion (e.g., PDCCH and/or PDSCH transmissions) and/or transmissions prior to the paging occasions but subsequent to the PEI transmission (e.g., SSB transmissions).

In aspects, PEI message 370 may include PEI configuration. The PEI configuration may include parameters associated with the PEI transmission, such as timing and/or resources of the PEI transmission, power-related parameters, etc. In additional or alternative aspects, the PEI configuration may be predefined and may be configured to UE 115 prior to receiving PEI message 370.

During operation of wireless communications system 300, base station 105 determines a transmit power of the PEI transmission within PEI message 370 to UE 115. In aspects, UE 115 may estimate the transmit power of the PEI transmission. For example, UE 115 may determine a power offset between the transmit power of the PEI transmission and the transmit power of at least one SSB transmission. UE 115 may then determine a tracking loop update and/or RRM measurements based on the estimated transmit power of the PEI transmission. However, estimating the transmit power of the PEI transmission by UE 115 may present issues as this may cause higher complexity in the implementation of system 300 and may result in further power consumption.

In aspects, UE 11 may determine the transmit power of the PEI transmission based on predefined configuration. For example, UE 115 may be configured (e.g., preconfigured) with information regarding the PEI transmission. In some aspects, UE 115 may receive PEI configuration dynamically from base station 105 (e.g., PEI configuration included in PEI message 370). The information regarding the PEI transmission may include information on the transmit power of the PEI transmission. For example, in some aspects, the transmit power of the PEI transmission may be explicitly defined in the PEI configuration of the PEI transmission as an absolute power value. For example, a power value may be explicitly configured indicating the signal strength of the PEI transmission, such as indicating an EPRE of the PEI transmission. The absolute power value may be specified in decibels per milliwatt (dBm).

In some aspects, the transmit power of the PEI transmission may be explicitly defined in the PEI configuration of the PEI transmission as a power offset with respect to another transmission (e.g., another signal or channel transmission). For example, base station 105 may transmit a second transmission 375 to UE 115. In aspects, a power offset may be specified in the PEI configuration with respect to second transmission 375. In this case, UE 115 may determine the transmit power of the PEI transmission by applying the power offset to the transmit power (e.g., signal strength) of the second transmission 375. In aspects, second transmission 375 may include another signal or channel transmission to which the power offset may be applied, and may include, without limitation, an SSS (e.g., an SSS received by UE 115 in an SSB transmission), a PSS (e.g., a PSS received by UE 115 in an SSB transmission), a PBCH transmission (e.g., a PBCH received by UE 115 in an SSB transmission), a paging PDCCH (e.g., a PDCCH received by UE 115 during a paging occasion), a paging PDSCH transmission (e.g., a PDSCH received by UE 115 during a paging occasion), a tracking reference signal (TRS), a channel state information reference signal (CSI-RS), etc. In aspects, second transmission 375 may include any signal that UE 115 may be configured to receive and for which UE 115 may be configured to determine a transmit power.

In aspects, UE 115 may be configured to determine the transmit power of the PEI transmission based on a transmit power of another transmission (e.g., second transmission 375). For example, UE 115 may be configured to determine a transmit power of second transmission 375, and may then determine or set the transmit power of the PEI transmission to be equal to the transmit power of second transmission 375. In aspects, second transmission 375 may include a transmission of a signal or channel, and may include, without limitation, an SSS (e.g., an SSS received by UE 115 in an SSB transmission), a PSS (e.g., a PSS received by UE 115 in an SSB transmission), a PBCH transmission (e.g., a PBCH received by UE 115 in an SSB transmission), a paging PDCCH (e.g., a PDCCH received by UE 115 during a paging occasion), a paging PDSCH transmission (e.g., a PDSCH received by UE 115 during a paging occasion), a tracking reference signal (TRS), a channel state information reference signal (CSI-RS), etc. In aspects, second transmission 375 may include any signal that UE 115 may be configured to receive and for which UE 115 may be configured to determine a transmit power.

In aspects, UE 115 may be configured to determine the transmit power of the PEI transmission based on a predefined relationship to another transmission (e.g., second transmission 375). In these cases, UE 115 may be configured to determine the predefined relationship between the transmit power of the PEI transmission and the second transmission 375. UE 115 may then obtain a measurement in accordance with the predefined relationship. UE 115 may then determine the transmit power of the PEI transmission based on the measurement and the predefined relationship. For example, UE 115 may determine that the transmit power of the PEI transmission is related to second transmission 375 based on the bandwidth of, or the total number of allocated resource elements for, the PEI transmission. UE 115 may determine that a power offset between the transmit power of second transmission 375 and the transmit power of the PEI signal may be derived based on the bandwidth of, or the total number of allocated resource elements for, the PEI transmission. UE 115 may derive the power offset between the transmit power of second transmission 375 and the transmit power of the PEI signal based on the bandwidth of, or the total number of allocated resource elements for, the PEI transmission, and may then determine the transmit power of the PEI transmission based on the power offset value and the transmit power of second transmission 375. In aspects, the predefined relationship between the transmit power of the PEI transmission and the transmit power of the second transmission 375 may be based on the number of repetitions of the PEI transmission. In this case, UE 115 may determine the power offset between the transmit power of the PEI transmission and the transmit power of second transmission 375 based on the number of repetitions of the PEI transmission.

In aspects, there may be an inverse proportion between the size of a bandwidth of the PEI transmission, or the number of repetitions of PEI transmission, and the transmit power (e.g., EPRE) of the PEI transmission to achieve a particular coverage. For example, as the bandwidth of the PEI transmission is increased, or as the number of repetitions of the PEI transmission increases, the transmit power may be reduced while still achieving coverage requirements.

In aspects, UE 115 may not be configured with the transmit power of the PEI transmission. For example, the transmit power of the PEI transmission may not be explicitly defined as an absolute value or as an offset. However, in aspects, a limited set of values may be used as a transmit power offset for a PEI transmission with respect to another transmission (e.g., another signal or channel transmission). In these aspects, UE 115 may be configured to estimate the transmit power offset of the PEI transmission with respect to another transmission based on the configuration that the transmit power of the PEI transmission is one of the limited set of values. In these aspects, UE 115 may more efficiently estimate the transmit power of the PEI transmission. In aspects, the limited set of values may be specified as a set of values or a range of values. For example, base station 105 may be configured to select a transmit power offset with respect to another transmission for a PEI transmission to UE 115 from the set of offset values including {0, 3, −3} dB. In this case, UE 115 may know that the transmit power offset with respect to another transmission for the PEI transmission is either, 0, 3, or −3 dB, and UE 115 may estimate the transmit power of the PEI transmission more quickly and accurately than estimating the transmit power without the limited set of offset values limitation. In another example, base station 105 may be configured to select a transmit power offset with respect to another transmission for a PEI transmission to UE 115 from the range of offset values including −3 dB to 3 dB. In this case, UE 115 may know that the transmit power of the PEI transmission has a power offset value with respect to another transmission between −3 dB and 3 dB, and UE 115 may estimate the transmit power of the PEI transmission more quickly and accurately than estimating the transmit power without the limited range of offset values limitation.

In aspects of the present disclosure, the PEI transmission may be beamformed. In these aspects, configuring UE 115 to determine the transmit power of the PEI transmission may depend on characteristics of the beamformed PEI transmission. For example, in some cases, the transmit power of a PEI transmission may be the same for all beams. UE 115 may be configured to determine the transmit power of the PEI transmission based on a configuration (rather than estimating the transmit power) as discussed above. In these cases, a single configuration may be provided for all beams for the same PEI transmission. UE 115 may determine the transmit power of the PEI transmission for all beams based on the single configuration, as the PEI transmit power for all beams is the same.

In another example, the transmit power of a PEI transmission may be the different for different beams. This configuration may provide more flexibility to cover an irregular shape of a cell, but may present a more difficult scenario for determining the transmit power of the PEI transmission for the different beams. In aspects, UE 115 may be configured to determine the transmit power of the PEI transmission on the different beams based on a configuration (rather than estimating the transmit power) as discussed above. In these cases, an individual configuration may be provided for each different beam. UE 115 may determine the transmit power of the PEI transmission for the different beams based on a respective configuration for the respective beam. In aspects, a beam for a PEI transmission may be explicitly indicated based on a QCL with SSB transmission, or may be implicitly determined based on a timeline association with SSB transmissions.

Figure 5:
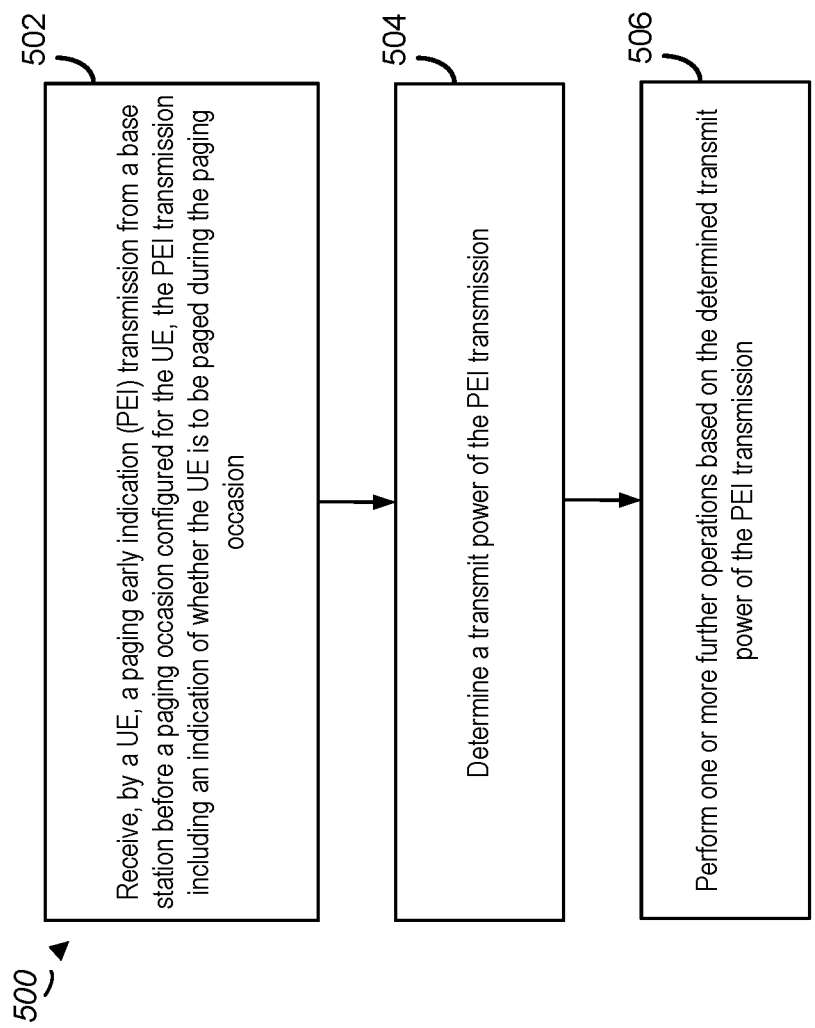
FIG. 5 is a flow diagram illustrating an example process that supports mechanisms for determining a transmit power of a PEI transmission in a wireless communication system according to one or more aspects.
Figure 7:
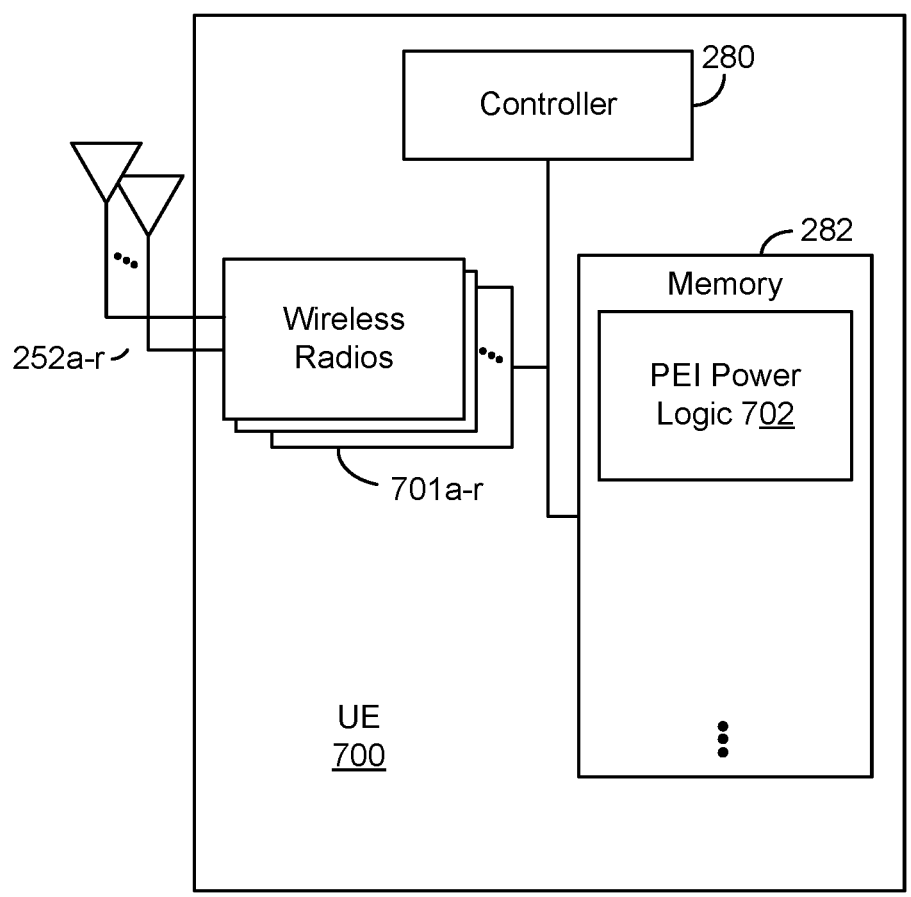
FIG. 7 is a block diagram of an example UE that supports mechanisms for determining a transmit power of a PEI transmission in a wireless communication system according to one or more aspects.

FIG. 5 is a flow diagram illustrating an example process 500 that supports mechanisms for determining a transmit power of a PEI transmission in a wireless communication system according to one or more aspects of the present disclosure. Operations of process 500 may be performed by a UE, such as UE 115 described above with reference to FIGS. 1-4, or UE 700 described with reference to FIG. 7. For example, example operations (also referred to as "blocks") of process 500 may enable UE 115 to support mechanisms for determining a transmit power of a PEI transmission. FIG. 7 is a block diagram illustrating UE 700 configured according to aspects of the present disclosure. UE 700 includes the structure, hardware, and components as illustrated for UE 115 of FIG. 2. For example, UE 700 includes controller/processor 280, which operates to execute logic or computer instructions stored in memory 282, as well as controlling the components of UE 700 that provide the features and functionality of UE 700. UE 700, under control of controller/processor 280, transmits and receives signals via wireless radios 701a-r and antennas 252a-r. Wireless radios 701a-r includes various components and hardware, as illustrated in FIG. 2 for UE 115, including modulator/demodulators 254a-r, MIMO detector 256, receive processor 258, transmit processor 264, and TX MIMO processor 266.

At block 502 of process 500, a UE (e.g., UE 700 or UE 115) receives a PEI transmission from a base station (e.g., base station 105) before a paging occasion configured for the UE. In order to implement the functionality for such operations, UE 115, under control of controller/processor 280, may a PEI transmission from base station 105 before a paging occasion configured for the UE via wireless radios 901a-r and antennas 252a-r. In aspects, the PEI transmission may include an indication of whether the UE is to be paged during the paging occasion.

At block 504, of process 500, UE 115 determines a transmit power of the PEI transmission. In order to implement the functionality for such operations, the UE, under control of controller/processor 280, executes PEI power logic 702, stored in memory 282. The functionality implemented through the execution environment of PEI power logic 702 allows for the UE to perform PEI power determination operations according to the various aspects herein.

In aspects, determining the transmit power of the PEI transmission may include obtaining the transmit power of the PEI transmission as an absolute power value from a PEI configuration. The PEI configuration may be received from base station 105. In aspects, determining the transmit power of the PEI transmission may include obtaining the transmit power of the PEI transmission from the PEI configuration based on a transmit power of a second transmission. The second transmission may include one or more of an SSS transmission, a PSS transmission, a PBCH transmission, a PDCCH transmission received by UE 115 during a second paging occasion, a PDSCH transmission received by UE 115 during the second paging occasion, a TRS transmission, or a CSI-RS transmission.

In aspects, obtaining the transmit power of the PEI transmission from the PEI configuration based on the transmit power of the second transmission may include obtaining the transmit power of the PEI transmission from the PEI configuration as a power offset with respect to the transmit power of the second transmission, determining the transmit power of the PEI transmission to be equal to the transmit power of the second transmission, and/or determining the transmit power of the PEI transmission based on a predefined relationship between the transmit power of the PEI transmission and the transmit power of the second transmission.

In aspects, UE 115 may be determined to determine the transmit power of the PEI transmission based on a power offset value with respect to a transmit power of a second transmission from a limited set of power offset values. In aspects, the limited set of power offset values may include a set of offset values and/or a range of offset values.

In aspects, UE 115 may receive the PEI transmission from base station 105 as a beamformed transmission over a plurality of beams. In aspects, the transmit power of the PEI transmission over each beam of the plurality beams may be the same transmit power. In these aspects, UE 115 may determine the transmit power of the PEI transmission based on a single PEI configuration that applies to all beams of the plurality of beams. In some aspects, the transmit power of PEI transmission may be different over the different beams of the plurality of beams. For example, a transmit power of the PEI transmission over a first beam of the plurality beams may be different from a transmit power of the PEI transmission over a second beam of the plurality beams. In these aspects, UE 115 may determine the transmit power of the PEI transmission over each beam based on a PEI configuration that applies to the respective beam. For example, UE 115 may determine the transmit power of the PEI transmission over the first beam based on a first configuration, and may determine the transmit power of the PEI transmission over the second beam based on a second configuration different from the first configuration. In aspects, UE 115 may be configured to determine a QCL of the PEI transmission received over a beam of the plurality of beams.

In some aspects, as noted above, instead of using a CRS as a power reference, UE 115 may be configured to use a power of an SSB transmission as a power reference for making power measurement determinations. In these aspects, the PEI transmission may be beamformed and UE 115 may determine the QCL for the PEI transmission.

At block 506 of process 500, UE 115 performs one or more further operations based on the determined transmit power of the PEI. In aspects, the further operations may include, in some aspects, one or more of measuring a parameter associated with RRM mobility operations based on the determined transmit power of the PEI, or updating an AGC based on the determined power of the PEI transmission.

Figure 6:
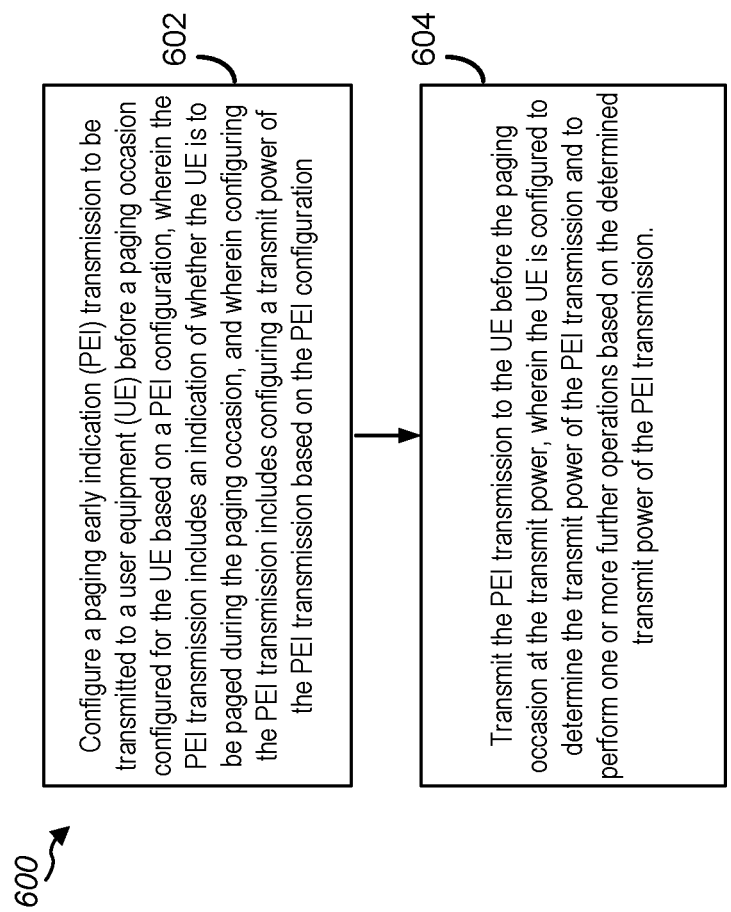
FIG. 6 is a flow diagram illustrating an example process that supports mechanisms for determining a transmit power of a PEI transmission in a wireless communication system according to one or more aspects.
Figure 8:
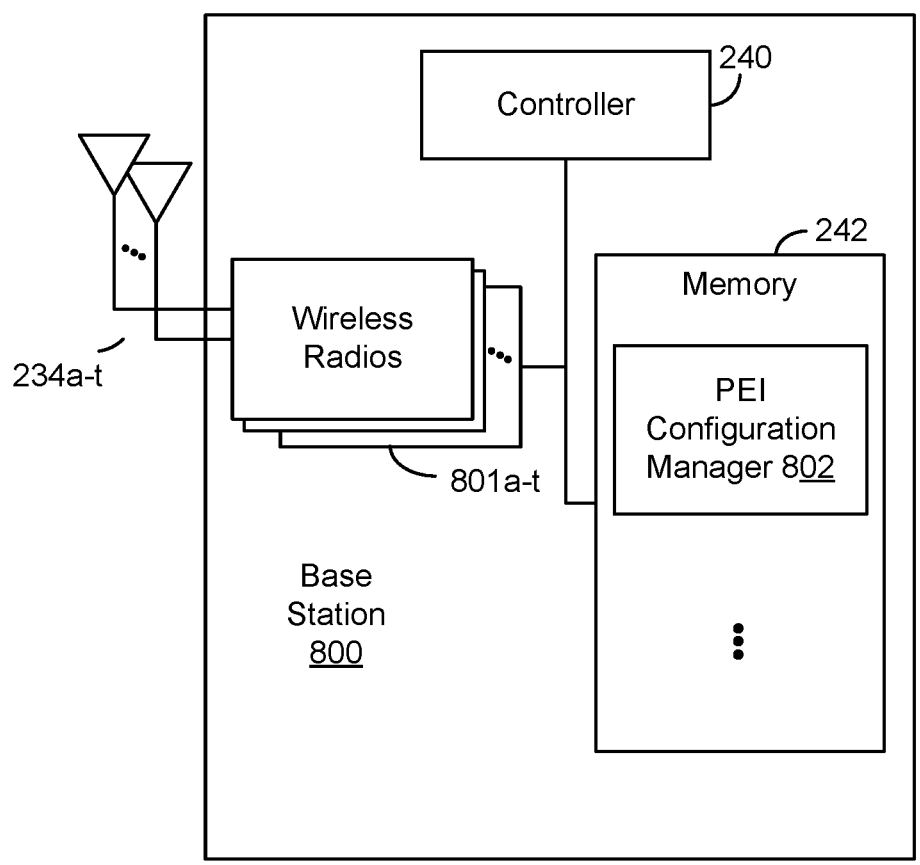
FIG. 8 is a block diagram of an example base station that supports mechanisms for determining a transmit power of a PEI transmission in a wireless communication system according to one or more aspects.

FIG. 6 is a block diagram illustrating an example an example process 600 that supports mechanisms for determining a transmit power of a PEI transmission in a wireless communication system according to one or more aspects. Operations of process 600 may be performed by a base station, such as base station 105 described above with reference to FIGS. 1-4, or base station 800 described with reference to FIG. 8. FIG. 8 is a block diagram illustrating base station 800 configured according to one aspect of the present disclosure. Base station 800 includes the structure, hardware, and components as illustrated for base station 105 of FIG. 2. For example, base station 800 includes controller/processor 240, which operates to execute logic or computer instructions stored in memory 242, as well as controlling the components of base station 800 that provide the features and functionality of base station 800. Base station 800, under control of controller/processor 240, transmits and receives signals via wireless radios 801*a-t* and antennas 234*a-t*. Wireless radios 801*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 602, a base station (e.g., base station 105 or UE 800) configures a PEI transmission to be transmitted to a UE (e.g., UE 115) before a paging occasion configured for the UE based on a PEI configuration. In order to implement the functionality for such operations, base station 105, under control of controller/processor 240, executes PEI configuration manager 802, stored in memory 242. The functionality implemented through the execution environment of PEI configuration manager 802 allows for base station 105 to perform PEI configuration operations according to the various aspects herein.

In aspects, the PEI transmission may include an indication of whether the UE is to be paged during the paging occasion. In aspects, configuring the PEI transmission may include configuring a transmit power of the PEI transmission based on the PEI configuration.

In aspects, base station 105 may generate the PEI configuration for configuring the PEI transmission to UE 115, and/or may obtain the PEI configuration from predetermined configuration. In aspects, the PEI configuration may include information defining the PEI transmission. For example, the PEI configuration information may include a paging occasion associated with the PEI transmission. The PEI configuration may include an indication of whether the UE is to be paged during the associated paging occasion.

At block 604, base station 105 transmits the PEI transmission to a UE (e.g., UE 115) before the paging occasion associated with the PEI transmission. In order to implement the functionality for such operations, the base station, under control of controller/processor 240, may transmit the PEI transmission to UE 115 via wireless radios 1001*a-r* and antennas 234*a-t*. The PEI transmission may be transmitted at a transmit power.

In some aspects, the PEI transmission may include the PEI configuration. In some aspects, UE 115 may be preconfigured with the PEI configuration. In aspects, base station 105 may configure the transmit power of the PEI transmission based on an absolute power value and/or a transmit power of a second transmission. In aspects, the second transmission may include one or more of an SSS transmission, a PSS transmission, a PBCH transmission, a PDCCH transmission received by UE 115 during a second paging occasion, a PDSCH transmission received by UE 115 during the second paging occasion, a TRS transmission, or a CSI-RS transmission.

In aspects, base station 105 may configure the transmit power of the PEI transmission to be a transmit power based on a power offset with respect to the transmit power of the second transmission, a transmit power equal to the transmit power of the second transmission, and/or a transmit power based on a predefined relationship between the transmit power of the PEI transmission and the transmit power of the second transmission. In some aspects, the transmit power of the PEI transmission may be based on a power offset value with respect to a transmit power of a second transmission from a limited set of power offset values. In aspects, the limited set of power offset values may include a set of offset values and/or a range of offset values.

At block 604 of process 600, base station 105 transmits the PEI transmission to the UE before the paging occasion at the transmit power. In aspects, UE 115 may be configured to determine the transmit power of the PEI transmission based on the PEI configuration, and to perform additional procedures based on the determined transmit power of the PEI transmission. For example, in some aspects, UE 115 may be configured to measure a parameter associated with RRM mobility operations based on the determined transmit power of the PEI, and/or to update an AGC based on the determined power of the PEI transmission.

In aspects, base station 105 may transmit the PEI transmission to UE 115 as a beamformed transmission over a plurality of beams. In aspects, the transmit power of the PEI transmission over each beam of the plurality beams may be the same transmit power. In these aspects, base station 105 may include an indication for UE 115 to determine the transmit power of the PEI transmission based on a single PEI configuration that applies to all beams of the plurality of beams. In some aspects, the transmit power of PEI transmission may be different over the different beams of the plurality of beams. For example, a transmit power of the PEI transmission over a first beam of the plurality beams may be different from a transmit power of the PEI transmission over a second beam of the plurality beams. In these aspects, base station 105 may include an indication for UE 115 to determine the transmit power of the PEI transmission over each beam based on a PEI configuration that applies to the respective beam. For example, base station 105 may include an indication for UE 115 to determine the transmit power of the PEI transmission over the first beam based on a first configuration, and to determine the transmit power of the PEI transmission over the second beam based on a second configuration different from the first configuration.

In one or more aspects, techniques for supporting mechanisms for determining a transmit power of a PEI transmission in a wireless communication system according to one or more aspects may include additional aspects, such as any single aspect or any combination of aspects described below or in connection with one or more other processes or devices described elsewhere herein. In a first aspect, supporting mechanisms for determining a transmit power of a PEI transmission in a wireless communication system may include an apparatus configured to receive as PEI transmission from a base station before a paging occasion configured for the apparatus. In this aspect, the PEI transmission includes an indication of whether the apparatus is to be paged during the paging occasion. The apparatus may also be configured to determine a transmit power of the PEI transmission, and to perform one or more further operations based on the determined transmit power of the PEI transmission. Additionally, the apparatus may perform or operate according to one or more aspects as described below. In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, alone or in combination with the first aspect, the techniques of the first aspect include performing one or more further operations based on the determined transmit power of the PEI.

In a third aspect, alone or in combination with one or more of the first aspect or the second aspect, the one or more further operations includes measuring a parameter associated with RRM mobility operations based on the determined transmit power of the PEI.

In a fourth aspect, alone or in combination with the third aspect, the one or more further operations includes updating an AGC based on the determined power of the PEI.

In a fifth aspect, alone or in combination with one or more of the first aspect through the fourth aspect, determining the transmit power of the PEI transmission includes obtaining the transmit power of the PEI transmission as an absolute power value from a PEI configuration.

In a sixth aspect, alone or in combination with the fifth aspect, determining the transmit power of the PEI transmission includes obtaining the transmit power of the PEI transmission from the PEI configuration based on a transmit power of a second transmission.

In a seventh aspect, alone or in combination with one or more of the first aspect through the sixth aspect, the second transmission includes one or more of an SSS transmission, a PSS transmission, a PBCH transmission, a PDCCH transmission received by UE 115 during a second paging occasion, a PDSCH transmission received by UE 115 during the second paging occasion, a TRS transmission, or a CSI-RS transmission.

In an eighth aspect, alone or in combination with one or more of the first aspect through the seventh aspect, obtaining the transmit power of the PEI transmission from the PEI configuration based on the transmit power of the second transmission includes obtaining the transmit power of the PEI transmission from the PEI configuration as a power offset with respect to the transmit power of the second transmission.

In a ninth aspect, alone or in combination with the eighth aspect, obtaining the transmit power of the PEI transmission from the PEI configuration based on the transmit power of the second transmission includes determining the transmit power of the PEI transmission to be equal to the transmit power of the second transmission.

In a tenth aspect, alone or in combination with one or more of the eighth aspect through the ninth aspect, obtaining the transmit power of the PEI transmission from the PEI configuration based on the transmit power of the second transmission includes determining the transmit power of the PEI transmission based on a predefined relationship between the transmit power of the PEI transmission and the transmit power of the second transmission.

In an eleventh aspect, alone or in combination with one or more of the first aspect through the tenth aspect, the transmit power of the PEI transmission is based on a power offset value with respect to a transmit power of a second transmission from a limited set of power offset values.

In a twelfth aspect, alone or in combination with the eleventh aspect, determining the transmit power of the PEI transmission includes estimating the transmit power of the PEI transmission based on the offset value from the limited set of power values.

In a thirteenth aspect, alone or in combination with one or more of the first aspect through the twelfth aspect, the PEI transmission received from the base station is beamformed over a plurality of beams.

In a fourteenth aspect, alone or in combination with the thirteenth aspect, the techniques of the first aspect may include determining the transmit power of the PEI transmission includes determining a QCL of the PEI transmission received over a beam of the plurality of beams.

In a fifteenth aspect, alone or in combination with one or more of the first aspect through the fourteenth aspect, a transmit power of the PEI transmission over each beam of the plurality beams is a same transmit power.

In a sixteenth aspect, alone or in combination with the fifteenth aspect, determining the transmit power of the PEI transmission includes determining the transmit power of the PEI transmission over each beam of the plurality beams based on a single configuration for all beams in the plurality of beams.

In a seventeenth aspect, alone or in combination with one or more of the first aspect through the sixteenth aspect, a transmit power of the PEI transmission over a first beam of the plurality beams is different from a transmit power of the PEI transmission over a second beam of the plurality beams.

In an eighteenth aspect, alone or in combination with the seventeenth aspect, determining the transmit power of the PEI transmission includes determining the transmit power of the PEI transmission over the first beam based on a first configuration.

In a nineteenth aspect, alone or in combination with one or more of the seventeenth aspect through the eighteenth aspect, determining the transmit power of the PEI transmission includes determining the transmit power of the PEI transmission over the second beam based on a second configuration different from the first configuration.

In a twentieth aspect, alone or in combination with one or more of the first aspect through the nineteenth aspect, the UE is configured to use a power of an SSB transmission as a power reference for power measurement determinations.

In a twenty-first aspect, supporting mechanisms for determining a transmit power of a PEI transmission in a wireless communication system may include an apparatus configured to configure a PEI transmission to be transmitted to a UE before a paging occasion configured for the UE based on a PEI configuration. In this aspect, the PEI transmission includes an indication of whether the UE is to be paged during the paging occasion, and configuring the PEI transmission includes configuring a transmit power of the PEI transmission based on the PEI configuration. The apparatus is further configured to transmit the PEI transmission to the UE before the paging occasion at the transmit power. In this aspect, the UE is configured to determine the transmit power of the PEI transmission and to perform one or more further operations based on the determined transmit power of the PEI transmission. Additionally, the apparatus may perform or operate according to one or more aspects as described below. In some implementations, the apparatus includes a wireless device, such as a base station. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-second aspect, alone or in combination with one or more of the twenty-first aspect through the twenty-first aspect, the one or more further operations includes measuring a parameter associated with RRM mobility operations based on the determined transmit power of the PEI transmission.

In a twenty-third aspect, alone or in combination with the twenty-second aspect, the one or more further operations includes updating an AGC based on the determined power of the PEI transmission.

In a twenty-fourth aspect, alone or in combination with one or more of the twenty-first aspect through the twenty-third aspect, configuring the transmit power of the PEI transmission includes configuring the transmit power of the PEI transmission based on an absolute power value.

In a twenty-fifth aspect, alone or in combination with the twenty-fourth aspect, configuring the transmit power of the PEI transmission includes configuring the transmit power of the PEI transmission based on a transmit power of a second transmission.

In a twenty-sixth aspect, alone or in combination with one or more of the twenty-first aspect through the twenty-fifth aspect, the second transmission includes one or more of an SSS transmission, a PSS transmission, a PBCH transmission, a PDCCH transmission received by UE 115 during a second paging occasion, a PDSCH transmission received by UE 115 during the second paging occasion, a TRS transmission, or a CSI-RS transmission.

In a twenty-seventh aspect, alone or in combination with one or more of the twenty-first aspect through the twenty-sixth aspect, configuring the transmit power of the PEI transmission based on the transmit power of the second transmission includes configuring the transmit power of the PEI transmission based on a power offset with respect to the transmit power of the second transmission.

In a twenty-eighth aspect, alone or in combination with the twenty-seventh aspect, configuring the transmit power of the PEI transmission based on the transmit power of the second transmission includes configuring the transmit power of the PEI transmission based on a transmit power equal to the transmit power of the second transmission.

In a twenty-ninth aspect, alone or in combination with one or more of the twenty-seventh aspect through the twenty-eighth aspect, configuring the transmit power of the PEI transmission based on the transmit power of the second transmission includes configuring the transmit power of the PEI transmission based on a predefined relationship between the transmit power of the PEI transmission and the transmit power of the second transmission.

In a thirtieth aspect, alone or in combination with one or more of the twenty-first aspect through the twenty-ninth aspect, configuring the transmit power of the PEI transmission includes configuring the transmit power of the PEI transmission based on a power offset value with respect to a transmit power of a second transmission from a limited set of power offset values.

In a thirty-first aspect, alone or in combination with one or more of the twenty-first aspect through the thirtieth aspect, the PEI transmission transmitted to the UE is beam-formed over a plurality of beams, and a transmit power of the PEI transmission over each beam of the plurality beams is a same transmit power.

In a thirty-second aspect, alone or in combination with the thirty-first aspect, the techniques of the nineteenth aspect include providing a single PEI configuration for all beams in the plurality of beams.

In a thirty-third aspect, alone or in combination with one or more of the twenty-first aspect through the thirty-second aspect, the PEI transmission transmitted to the UE is beam-formed over a plurality of beams.

In a thirty-fourth aspect, alone or in combination with the thirty-third aspect, a transmit power of the PEI transmission over a first beam of the plurality beams is different from a transmit power of the PEI transmission over a second beam of the plurality beams.

In a thirty-fifth aspect, alone or in combination with one or more of the thirty-third aspect through the thirty-fourth aspect, the techniques of the nineteenth aspect include providing a first PEI configuration for the first beam based on which the UE is to determine the transmit power of the PEI transmission over the first beam.

In a thirty-sixth aspect, alone or in combination with one or more of the thirty-third aspect through the thirty-fifth aspect, the techniques of the nineteenth aspect include providing a second PEI configuration for the second beam based on which the UE is to determine the transmit power of the PEI transmission over the second beam.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of wireless communication performed by a user equipment (UE), the method comprising:
   receiving, by the UE, a paging early indication (PEI) transmission from a base station before a paging occasion configured for the UE, the PEI transmission including an indication of whether the UE is to be paged during the paging occasion;
   determining a transmit power of the PEI transmission, wherein determining the transmit power of the PEI transmission includes obtaining the transmit power of the PEI transmission based on a transmit power of a second transmission; and
   performing one or more further operations based on the determined transmit power of the PEI transmission.

2. The method of claim 1, wherein the one or more further operations includes one or more of:
   measuring a parameter associated with radio resource management (RRM) mobility operations based on the determined transmit power of the PEI transmission; or
   updating an automatic gain control (AGC) based on the determined transmit power of the PEI transmission.

3. The method of claim 1, wherein determining the transmit power of the PEI transmission includes
   obtaining the transmit power of the PEI transmission from a PEI configuration.

4. The method of claim 1, wherein the second transmission includes one or more of:
   a secondary synchronization signal (SSS) transmission;
   a primary synchronization signal (PSS) transmission;
   a physical broadcast channel (PBCH) transmission;
   a physical downlink control channel (PDCCH) transmission received by the UE during a second paging occasion;
   a physical downlink shared channel (PDSCH) transmission received by the UE during the second paging occasion;
   a tracking reference signal (TRS) transmission; or
   a channel state information reference signal (CSI-RS) transmission.

5. The method of claim 1, wherein obtaining the transmit power of the PEI transmission includes one or more of:
   obtaining the transmit power of the PEI transmission as a power offset with respect to the transmit power of the second transmission;
   determining the transmit power of the PEI transmission to be equal to the transmit power of the second transmission; or
   determining the transmit power of the PEI transmission based on a predefined relationship between the transmit power of the PEI transmission and the transmit power of the second transmission.

6. The method of claim 1, wherein the transmit power of the PEI transmission is based on a power offset value with respect to the transmit power of the second transmission from a limited set of power offset values, and wherein determining the transmit power of the PEI transmission includes estimating the transmit power of the PEI transmission based on the power offset value from the limited set of power offset values.

7. The method of claim 1, wherein the PEI transmission received from the base station is beamformed over a plurality of beams, and further comprising determining a quasi-colocation (QCL) of the PEI transmission received over a beam of the plurality of beams.

8. The method of claim 7, wherein a transmit power of the PEI transmission over each beam of the plurality of beams is a same transmit power, wherein determining the transmit power of the PEI transmission includes:
   determining the transmit power of the PEI transmission over each beam of the plurality of beams based on a single configuration for all beams in the plurality of beams.

9. The method of claim 7, wherein a transmit power of the PEI transmission over a first beam of the plurality of beams is different from a transmit power of the PEI transmission over a second beam of the plurality of beams, wherein determining the transmit power of the PEI transmission includes:
   determining the transmit power of the PEI transmission over the first beam based on a first configuration; and
   determining the transmit power of the PEI transmission over the second beam based on a second configuration different from the first configuration.

10. The method of claim 1, wherein the UE is configured to use a power of a synchronization signal block (SSB) transmission as a power reference for power measurement determinations.

11. A method of wireless communication performed by a base station, the method comprising:
   configuring a paging early indication (PEI) transmission to be transmitted to a user equipment (UE) before a paging occasion configured for the UE based on a PEI configuration, wherein the PEI transmission includes an indication of whether the UE is to be paged during the paging occasion, wherein configuring the PEI transmission includes configuring a transmit power of the PEI transmission based on the PEI configuration, and wherein configuring the transmit power of the PEI transmission includes configuring the transmit power of the PEI transmission based on one or more of:
      an absolute power value; or
      a transmit power of a second transmission to the UE; and
   transmitting the PEI transmission to the UE before the paging occasion at the transmit power, wherein the UE is configured to determine the transmit power of the PEI transmission and to perform one or more further operations based on the determined transmit power of the PEI transmission.

12. The method of claim 11, wherein the one or more further operations includes one or more of:

measuring a parameter associated with radio resource management (RRM) mobility operations based on the determined transmit power of the PEI transmission; or updating an automatic gain control (AGC) based on the determined transmit power of the PEI transmission.

13. The method of claim 11, wherein the second transmission includes one or more of:

a secondary synchronization signal (SSS) transmission;

a primary synchronization signal (PSS) transmission;

a physical broadcast channel (PBCH) transmission;

a physical downlink control channel (PDCCH) transmission transmitted to the UE during a second paging occasion;

a physical downlink shared channel (PDSCH) transmission transmitted to the UE during the second paging occasion;

a tracking reference signal (TRS) transmission; or a channel state information reference signal (CSI-RS) transmission.

14. The method of claim 11, wherein configuring the transmit power of the PEI transmission based on the transmit power of the second transmission includes configuring the transmit power of the PEI transmission based on one or more of:

a power offset with respect to the transmit power of the second transmission;

a transmit power equal to the transmit power of the second transmission; or based on a predefined relationship between the transmit power of the PEI transmission and the transmit power of the second transmission.

15. The method of claim 11, wherein configuring the transmit power of the PEI transmission includes configuring the transmit power of the PEI transmission based on a power offset value with respect to the transmit power of the second transmission from a limited set of power offset values.

16. The method of claim 11, wherein the PEI transmission transmitted to the UE is beamformed over a plurality of beams, a transmit power of the PEI transmission over each beam of the plurality of beams being a same transmit power, and further comprising:

providing a single PEI configuration for all beams in the plurality of beams.

17. The method of claim 11, wherein the PEI transmission transmitted to the UE is beamformed over a plurality of beams, wherein a transmit power of the PEI transmission over a first beam of the plurality of beams is different from a transmit power of the PEI transmission over a second beam of the plurality of beams, and further comprising:

providing a first PEI configuration for the first beam based on which the UE is to determine the transmit power of the PEI transmission over the first beam; and providing a second PEI configuration for the second beam based on which the UE is to determine the transmit power of the PEI transmission over the second beam.

18. A user equipment (UE) comprising:

a memory storing processor-readable code; and at least one processor coupled to the memory, the at least one processor configured to execute the processor-readable code and cause the at least one processor to perform operations comprising:

receiving, by the UE, a paging early indication (PEI) transmission from a base station before a paging occasion configured for the UE, the PEI transmission including an indication of whether the UE is to be paged during the paging occasion;

determining a transmit power of the PEI transmission, wherein determining the transmit power of the PEI transmission includes obtaining the transmit power of the PEI transmission based on a transmit power of a second transmission; and performing one or more further operations based on the determined transmit power of the PEI transmission.

19. The UE of claim 18, wherein the one or more further operations includes one or more of:

measuring a parameter associated with radio resource management (RRM) mobility operations based on the determined transmit power of the PEI transmission; or updating an automatic gain control (AGC) based on the determined transmit power of the PEI transmission.

20. The UE of claim 18, wherein determining the transmit power of the PEI transmission includes:

obtaining the transmit power of the PEI transmission from a PEI configuration.

21. The UE of claim 18, wherein the second transmission includes one or more of:

a secondary synchronization signal (SSS) transmission;

a primary synchronization signal (PSS) transmission;

a physical broadcast channel (PBCH) transmission;

a physical downlink control channel (PDCCH) transmission received by the UE during a second paging occasion;

a physical downlink shared channel (PDSCH) transmission received by the UE during the second paging occasion;

a tracking reference signal (TRS) transmission; or a channel state information reference signal (CSI-RS) transmission.

22. The UE of claim 18, wherein obtaining the transmit power of the PEI transmission includes one or more of:

obtaining the transmit power of the PEI transmission as a power offset with respect to the transmit power of the second transmission;

determining the transmit power of the PEI transmission to be equal to the transmit power of the second transmission; or determining the transmit power of the PEI transmission based on a predefined relationship between the transmit power of the PEI transmission and the transmit power of the second transmission.

23. The UE of claim 18, wherein the transmit power of the PEI transmission is based on a power offset value with respect to the transmit power of the second transmission from a limited set of power offset values, and wherein determining the transmit power of the PEI transmission includes estimating the transmit power of the PEI transmission based on the power offset value from the limited set of power offset values.

24. The UE of claim 18, wherein the PEI transmission received from the base station is beamformed over a plurality of beams, and wherein the operations further comprise determining a quasi-colocation (QCL) of the PEI transmission received over a beam of the plurality of beams.

25. The UE of claim 24, wherein a transmit power of the PEI transmission over each beam of the plurality of beams is a same transmit power, wherein determining the transmit power of the PEI transmission includes:

determining the transmit power of the PEI transmission over each beam of the plurality of beams based on a single configuration for all beams in the plurality of beams.

26. A base station comprising:

a memory storing processor-readable code; and at least one processor coupled to the memory, the at least one processor configured to execute the processor-readable code and cause the at least one processor to perform operations comprising:

configuring a paging early indication (PEI) transmission to be transmitted to a user equipment (UE) before a paging occasion configured for the UE based on a PEI configuration, wherein the PEI transmission includes an indication of whether the UE is to be paged during the paging occasion, wherein configuring the PEI transmission includes configuring a transmit power of the PEI transmission based on the PEI configuration, and wherein configuring the transmit power of the PEI transmission includes configuring the transmit power of the PEI transmission based on one or more of:
an absolute power value; or
a transmit power of a second transmission to the UE; and transmitting the PEI transmission to the UE before the paging occasion at the transmit power, wherein the UE is configured to determine the transmit power of the PEI transmission and to perform one or more further operations based on the determined transmit power of the PEI transmission.

27. The base station of claim 26, wherein the one or more further operations includes one or more of:
measuring a parameter associated with radio resource management (RRM) mobility operations based on the determined transmit power of the PEI transmission; or
updating an automatic gain control (AGC) based on the determined transmit power of the PEI transmission.

28. The base station of claim 26, wherein the second transmission includes one or more of:
a secondary synchronization signal (SSS) transmission;
a primary synchronization signal (PSS) transmission;
a physical broadcast channel (PBCH) transmission;
a physical downlink control channel (PDCCH) transmission transmitted to the UE during a second paging occasion;
a physical downlink shared channel (PDSCH) transmission transmitted to the UE during the second paging occasion;
a tracking reference signal (TRS) transmission; or
a channel state information reference signal (CSI-RS) transmission.

29. The base station of claim 26, wherein the indication that the transmit power of the PEI transmission is based on based on the transmit power of the second transmission includes an indication that the transmit power of the second transmission is one or more of:
a power offset with respect to the transmit power of the second transmission;
a transmit power equal to the transmit power of the second transmission; or
based on a predefined relationship between the transmit power of the PEI transmission and the transmit power of the second transmission.

30. The base station of claim 26, wherein configuring the transmit power of the PEI transmission includes configuring the transmit power of the PEI transmission based on a power offset value with respect to the transmit power of the second transmission from a limited set of power offset values.

31. The base station of claim 26, wherein the PEI transmission transmitted to the UE is beamformed over a plurality of beams, a transmit power of the PEI transmission over each beam of the plurality of beams being a same transmit power, and further comprising:
providing a single PEI configuration for all beams in the plurality of beams.

32. The method of claim 6, wherein the limited set of power offset values comprises a set of $\{0, 3, -3\}$ dB power offset values.

33. The method of claim 1, wherein the transmit power of the PEI transmission is based on a power offset value with respect to the transmit power of the second transmission from a limited range of power offset values from −3 dB to 3 dB, and wherein determining the transmit power of the PEI transmission includes estimating the transmit power of the PEI transmission based on the power offset value from the limited range of power offset values.

34. The method of claim 15, wherein the limited set of power offset values comprises a set of $\{0, 3, -3\}$ dB power offset values.

35. The method of claim 11, wherein configuring the transmit power of the PEI transmission includes configuring the transmit power of the PEI transmission based on a power offset value with respect to the transmit power of the second transmission from a limited range of power offset values from −3 dB to 3 dB.

36. The UE of claim 23, wherein the limited set of power offset values comprises a set of $\{0, 3, -3\}$ dB power offset values.

37. The UE of claim 18, wherein the transmit power of the PEI transmission is based on a power offset value with respect to the transmit power of the second transmission from a limited range of power offset values from −3 dB to 3 dB, and wherein determining the transmit power of the PEI transmission includes estimating the transmit power of the PEI transmission based on the power offset value from the limited range of power offset values.

38. The base station of claim 30, wherein the limited set of power offset values comprises a set of $\{0, 3, -3\}$ dB power offset values.

39. The base station of claim 26, wherein configuring the transmit power of the PEI transmission includes configuring the transmit power of the PEI transmission based on a power offset value with respect to the transmit power of the second transmission from a limited range of power offset values from −3 dB to 3 dB.

* * * * *